United States Patent

Gillespie et al.

[11] Patent Number: 5,273,016
[45] Date of Patent: Dec. 28, 1993

[54] THROTTLE LEVER POSITION SENSOR FOR TWO-STROKE FUEL INJECTED ENGINE

[75] Inventors: George T. Gillespie, Franklin, Wis.; Fletcher C. Belt, Crystal Lake, Ill.; H. Norman Petersen, Kenosha, Wis.

[73] Assignee: Outboard Marine Corporation, Waukegan, Ill.

[21] Appl. No.: 954,492

[22] Filed: Sep. 30, 1992

[51] Int. Cl.⁵ .............................................. F02D 5/00
[52] U.S. Cl. ..................................... 123/403; 123/413; 440/87
[58] Field of Search .............. 123/399, 400, 403, 413, 123/350; 73/118.1; 440/87

[56] References Cited

U.S. PATENT DOCUMENTS

| | | | |
|---|---|---|---|
| 3,916,854 | 11/1975 | Barton et al. | 123/350 |
| 4,461,254 | 7/1984 | Pfalzgraf et al. | 123/399 |
| 4,524,745 | 6/1985 | Tominari et al. | 123/478 |
| 4,528,954 | 7/1985 | Slattery | 123/413 |
| 4,566,415 | 1/1986 | Iwai et al. | 123/400 |
| 4,643,149 | 2/1987 | Dunham et al. | 123/403 |
| 4,729,358 | 3/1988 | Morita et al. | 123/416 |
| 4,735,589 | 4/1988 | Irwin et al. | 440/87 |
| 4,745,901 | 5/1988 | Reifenberger et al. | 123/416 |
| 4,747,381 | 5/1988 | Baltz et al. | 123/413 |
| 4,843,555 | 6/1989 | Hattori et al. | 364/431 |
| 4,864,996 | 9/1989 | Hensel | 123/442 |
| 4,893,501 | 1/1990 | Sogawa | 73/188.1 |
| 4,895,120 | 1/1990 | Tobinaga et al. | 123/417 |
| 4,923,371 | 6/1990 | Albertson et al. | 123/403 |
| 4,981,127 | 1/1991 | Morikawa | 123/494 |
| 5,062,403 | 11/1991 | Breckenfeld et al. | 123/146 |
| 5,065,719 | 11/1991 | Panten et al. | 123/400 |
| 5,065,723 | 11/1991 | Broughton et al. | 123/413 |
| 5,191,866 | 3/1993 | Tosdale | 123/400 |

Primary Examiner—Tony M. Argenbright
Assistant Examiner—M. Macy
Attorney, Agent, or Firm—Michael, Best & Friedrich

[57] ABSTRACT

A marine propulsion device comprising a propulsion unit which is adapted to be mounted on a boat and which includes a propeller shaft and an internal combustion engine drivenly connected to the propeller shaft, the engine including engine block structure having a combustion chamber and defining an air intake passage communicable with the combustion chamber, a throttle plate movably supported by the engine block structure and located in the air intake passage, structure for moving the throttle plate in response to movement of an operator control member, and structure supported by the engine block structure for providing a signal indicating the position of the control member independent of the position of the throttle plate.

20 Claims, 5 Drawing Sheets

THROTTLE LEVER POSITION SENSOR FOR TWO-STROKE FUEL INJECTED ENGINE

BACKGROUND OF THE INVENTION

1. Technical Field

The invention relates generally to fuel injected, two-stroke engines and more particularly to throttle position sensors for use with fuel injected, two-stroke engines.

2. Related Prior Art

Attention is directed to the following prior art references:

| | | |
|---|---|---|
| 5,065,723 | Broughton et al. | November 19, 1991 |
| 5,062,403 | Breckenfeld et al. | November 5, 1991 |
| 4,981,127 | Morikawa | January 1, 1991 |
| 4,932,371 | Albertson et al. | June 12, 1990 |
| 4,895,120 | Tobinaga et al. | January 23, 1990 |
| 4,864,996 | Hensel | September 12, 1988 |
| 4,843,555 | Hattori et al. | June 27, 1989 |
| 4,747,381 | Baltz et al. | May 31, 1988 |
| 4,745,901 | Reifenberger et al. | May 24, 1988 |
| 4,729,358 | Morita et al. | March 8, 1988 |
| 4,643,149 | Dunham et al. | February 17, 1987 |
| 4,524,745 | Tominari et al. | June 25, 1985 |

The speed-load cycle under which a carbureted, two-stroke outboard motor operates entails a specific relationship between the boat operator's speed request, the engine ignition timing and throttle plate position. At low engine speeds, engine control is accomplished primarily through advancing or retarding the engine's ignition timing rather than through control of air flow to the engine by movement of the throttle plate.

At higher engine speeds, engine control is accomplished primarily through movement of the throttle plate with little change in the timing of the engine's ignition. For example, if the boat operator moves the remote control lever from an idle position to a 25% power position, the operator indicates that engine speed is to increase to approximately 25% of full speed. An increase in engine speed from idle to 25% of full speed is typically primarily accomplished through an advance in ignition timing of approximately 12° and only a slight opening of the throttle plate. Further advance of the remote throttle control lever from 25% to 100%, or wide open throttle, has little effect upon ignition timing, which is typically already fully advanced at 25% throttle, but moves the throttle plate from a slightly opened position to a fully opened position. These relationships between the boat operator's speed requests, ignition timing, and throttle plate position are well known and desirable. These relationships are normally accomplished in carbureted, two-stroke engines through a series of mechanical linkages and cams.

A fuel-injected, two-stroke outboard motor is generally known to use an electronic control unit to control engine operation. On some fuel injected, two-stroke engines, two of the primary input signals used by the electronic engine control unit for controlling the engine's ignition timing, its fuel injectors and other components are input signals indicating the operator's speed request and the engine's speed. To provide such an input signal indicating the operator's signal request, it is known to locate a sensor on the engine's throttle plate. It is also known to provide a sensor on the remotely located operator control member itself to provide a signal indicating the position of the operator control member. U.S. Pat. No. 4,932,371 shows such an arrangement including a sensor located on an accelerator pedal located remotely from the engine.

SUMMARY OF THE INVENTION

If the input signal indicating the operator's speed request is provided by a sensor located on the throttle plate, it may be difficult to achieve adequate engine control at low engine speeds because the throttle plate moves only slightly during relatively large advances in the operator's speed requests (as indicated by movement of the remote operator control lever). Also, in some applications, such as outboard motors, the location of an operator control position sensor remotely from the engine is impractical.

The invention provides a marine propulsion device comprising a propulsion unit which is adapted to be mounted on a boat and which includes a propeller shaft and an internal combustion engine drivingly connected to the propeller shaft, the engine including engine block means having a combustion chamber and defining an air intake passage communicable with the combustion chamber, a throttle plate movably supported by the engine block means and located in the air intake passage, means for moving the throttle plate in response to movement of an operator control member, and means supported by said engine block means for providing a signal indicating the position of the control member independent of the position of the throttle plate.

One embodiment of the invention provides an internal combustion engine comprising engine block means having therein a combustion chamber, means for supplying air to the combustion chamber, the means including a throttle lever which is rotatably of positions and which is adapted to be operably connected to an operator control member, a moveable throttle plate, and means for moving the throttle plate in response to movement of the throttle lever, and means responsive to movement of the throttle lever for providing a signal independent of movement of the throttle plate.

One embodiment of the invention provides an outboard motor comprising a lower unit which is adapted to be mounted on a boat and which includes a propeller shaft, and an internal combustion engine supported by the lower unit and drivingly connected to the propeller shaft, the engine including engine block means having a combustion chamber and defining an air intake passage communicable with the combustion chamber, a throttle plate movably supported by the engine block means and located in the air intake passage, means for moving the throttle plate in response to movement of an operator control member, the means for moving the throttle plate including a throttle lever movably supported by the engine block means, and a lost motion linkage for moving the throttle plate in response to movement of the throttle lever only over a portion of the range of movement of the throttle lever, and including a sensor connected to the throttle lever means for providing to an electronic control unit a signal indicating the position of the control member independent of the position of the throttle plate.

Another feature of the invention is the provision of a marine propulsion device including a sensor that provides a signal indicative of the operator's speed request and that does not necessitate wires extending between the boat and the engine. Such wires are eliminated by mounting the sensor on the engine.

Another feature of the invention is the provision of a fuel injected, two-stroke engine for which operator speed requests are sensed independently of throttle plate position. This allows the engine to be accurately controlled at low engine speeds.

Another feature of the invention is the provision of a marine propulsion device including a sensor that provides a signal indicative of the operator's speed request and that is positioned so that at low throttle openings any small change in the throttle plate position is amplified when detected by the sensor, and conversely, at large throttle openings a similar change in throttle plate position provides a smaller change in signal by the sensor. Because the air flow through a throttle tends to increase more per degree of additional throttle plate opening at low throttle openings, it is desirable to determine the throttle plate position at greater accuracy at these low openings.

Various other features and advantages of the invention will become apparent to those skilled in the art upon review of the following detailed description, claims and drawings.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION

Figure 1:
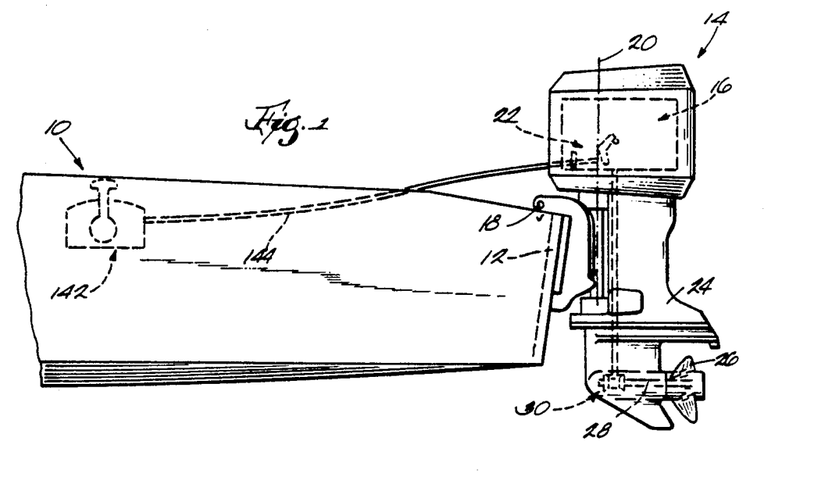
FIG. 1 is a left side, elevation view of a portion of a boat and a marine propulsion device embodying the invention.

FIG. 1 illustrates a boat 10 having a transom 12 and a marine propulsion device 14 in the form of an outboard motor mounted on the transom 12. The marine propulsion device 14 includes a propulsion unit 16 mounted on the transom 12 for pivotal movement relative thereto about a tilt axis 18 and about a steering axis 20. The propulsion unit 16 includes an internal combustion engine 22, a lower unit 24 supporting the engine 22, and a propeller 26 that is mounted on a propeller shaft 28 which is driven by the engine 22 through a reversing transmission 30 in the lower unit 24. Preferably, the engine 22 is a two-stroke engine.

The engine 22 provides (FIGS. 2–4) engine block means 32 including an engine block 34. The engine block 34 has (FIG. 2) extending therein a cylinder bore 36 (shown schematically in FIG. 2). The engine 22 also includes a cylinder head 38 that overlies the cylinder bore 36 and that is fixed to the engine block 34.

The engine block means 32 also includes (FIG. 4) a crankcase cover 40 that is fixed to the engine block 34 and that, with the engine block 34, defines a crankcase 42 (shown in FIGS. 2 and 4) communicable with the cylinder bore 36. For reasons discussed below, the crankcase cover 40 provides (see FIGS. 4 and 5) an externally extending boss 44. The crankcase cover 40 has therein a crankcase opening 48 that communicates with the crankcase 42 and that is surrounded by an intake and throttle housing mounting surface 50.

The engine block means 32 also includes an intake and throttle housing 52 that is fixed to the crankcase cover 40. The intake and throttle housing 52 has a first portion 54 through which extends a first passage portion 56 communicating with the crankcase opening 48, and a second portion 58 through which extends a second passage portion 60. The first portion 54 of the intake and throttle housing 52 has a crankcase mounting surface 62 that surrounds one end of the first passage portion 56 and that mates with the intake and throttle housing mounting surface 50.

The engine block means 32 also includes a plenum cover 64 that is supported on the opposite side of the intake and throttle housing 54 (from the crankcase 42) and that, with the first and second passage portions 56 and 58, definer a U-shaped intake passage 66 communicable between the atmosphere and the crankcase 42.

While the engine block 34, the crankcase cover 40, the intake and throttle housing 52 and the plenum cover 64 are shown as being discrete elements, the engine block means 32 can also be formed as a single, unitary element including the structural characteristics of the illustrated individual elements.

Figure 2:
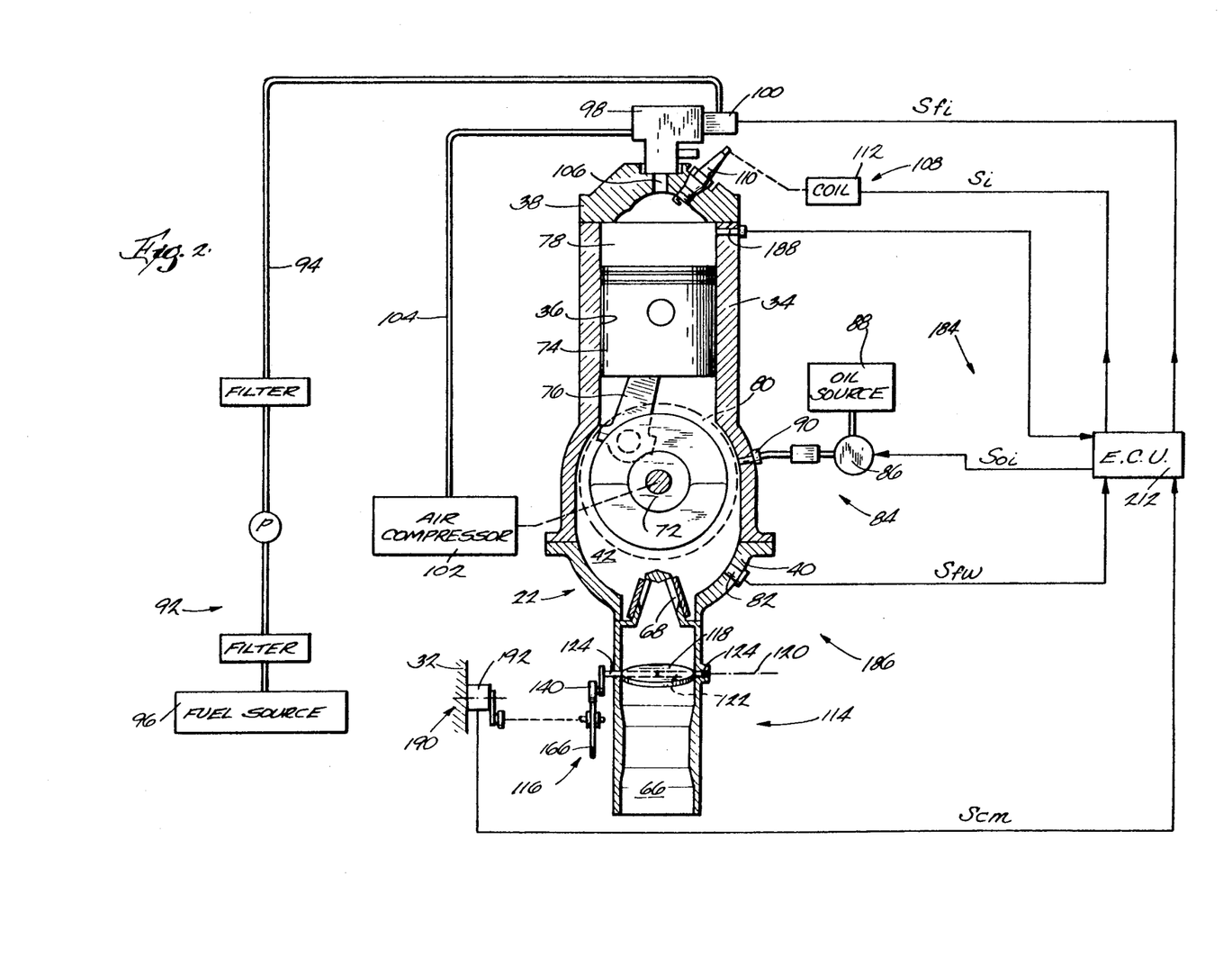
FIG. 2 is a schematic view of the engine and the engine control system included in the marine propulsion device shown in FIG. 1.

As shown in FIG. 2, the intake passage 66 is communicable with the crankcase 42 through a one-way reed valve 68 that, during engine operation, affords air flow from the atmosphere into the crankcase 42 but prevents air flow from the crankcase 42 into the intake passage 66 (the reed valve 68 is not shown in FIGS. 1 and 3–7).

As shown in FIG. 2, housed within the crankcase 42 and rotatably supported by the crankcase cover 40 and engine block 34 is a crank shaft 72. The cylinder bore 36 slidably houses a piston 74 that is connected to the crank shaft 72 by a crank arm 76 and that, with the cylinder bore 36 and cylinder head 38, defines a combustion chamber 78.

The engine 22 also includes a flywheel 80 (shown in phantom) fixed to the crank shaft 72 for common rotation therewith. A crank position sensor 82 is located in the crankcase cover 40 for providing a flywheel position signal (identified schematically in FIG. 2 as $S_{fw}$) which indicates the position of the flywheel 80. The speed of the engine 22 and location of the piston 74 can be determined from the flywheel position signal $S_{fw}$ in a manner discussed below.

The engine 22 also includes (FIG. 2) an oil metering and distribution unit 84 for providing lubricant to the crankcase 42. The oil distribution unit 84 communicates with an oil pump 86 that communicates, in turn, with a reservoir of oil 88. In response to an oil injection signal (identified schematically in FIG. 2 as $S_{oi}$) provided in a manner discussed below, the oil distribution unit 84 sprays a measured charge of lubricant into the crankcase 42 through a nozzle 90 extending through the engine block 34.

The engine 22 also includes means 92 for supplying fuel to the combustion chamber 78. While various arrangements for the fuel supply means 92 can be successfully used, in the illustrated embodiment the fuel supply means 92 includes a fuel line 94 communicating with a fuel source 96 and an air/fuel injector 98 mounted on the cylinder head 38 adjacent the combustion chamber 78. The air/fuel injector 98 includes a fuel metering injector pump 100 communicating with the fuel line 94 for providing a measured charge of fuel under relatively high pressure. The fuel supply means 92 also includes an air compressor 102 driven by the engine 22, and a compressed air line 104 which communicates between the air compressor 102 and the air/fuel injector 98 for supplying compressed air to the air/fuel injector 98. The air/fuel injector 98 can be of conventional construction and, in response to a fuel injection signal $S_{fi}$ provided in a manner discussed below, can inject a mixture of fuel and high-pressure air through a fuel injector nozzle 106 that extends into and communicates with the combustion chamber 78.

The engine 22 also includes an ignition system 108. The ignition system 108 includes a spark plug 110 that is mounted in the cylinder head 38 and extends into the combustion chamber 78 in a conventional manner for causing combustion of the air/fuel mixture in the combustion chamber 78. The ignition system 108 also includes a coil 112 operably connected to the spark plug 110 for providing current to the spark plug 110 in response to an ignition signal $S_i$ provided in a manner discussed below.

The engine 22 also includes (FIGS. 2-5) means 114 for supplying air to the combustion chamber 78. Such means 114 for supplying air to the combustion chamber 78 includes the intake passage 66 and a throttle 116 for selectively controlling the flow of air through the intake passage 66. The throttle 116 includes (FIGS. 4 and 5) a pivotable throttle plate 118 housed within the second passage portion 60 of the intake and throttle housing 52. The throttle plate 118 is supported for pivotable movement about a throttle valve axis 120 by a throttle plate shaft 122 that is supported by the intake and throttle housing 52. The throttle plate shaft has (FIG. 5) opposite ends or stems 124 (only one of which is illustrated) extending outwardly of the second portion 58 of the intake and throttle housing 52. The throttle plate 118 is rotatable about the throttle valve axis 120 from a closed position through a range of open positions to a wide-open position. In the closed position, the throttle plate 66. When moved away from the closed position, the throttle plate 118 affords a flow of air through the intake passage 66 into the crankcase 42.

The means 114 for supplying air to the combustion chamber 78 also includes means 126 for biasing the throttle plate 118 toward the closed position. The biasing means 126 includes (see FIG. 5) a coil spring 128 that surrounds one of the stems 124 and that is fixed to the stem 124 by a roll pin 130 extending through the stem 124. The coil spring 128 is also fixed to the second portion 58 of the intake and throttle housing 52 and biases the throttle plate shaft 122 and the throttle plate 118 supported thereby toward the closed position.

Figure 5:
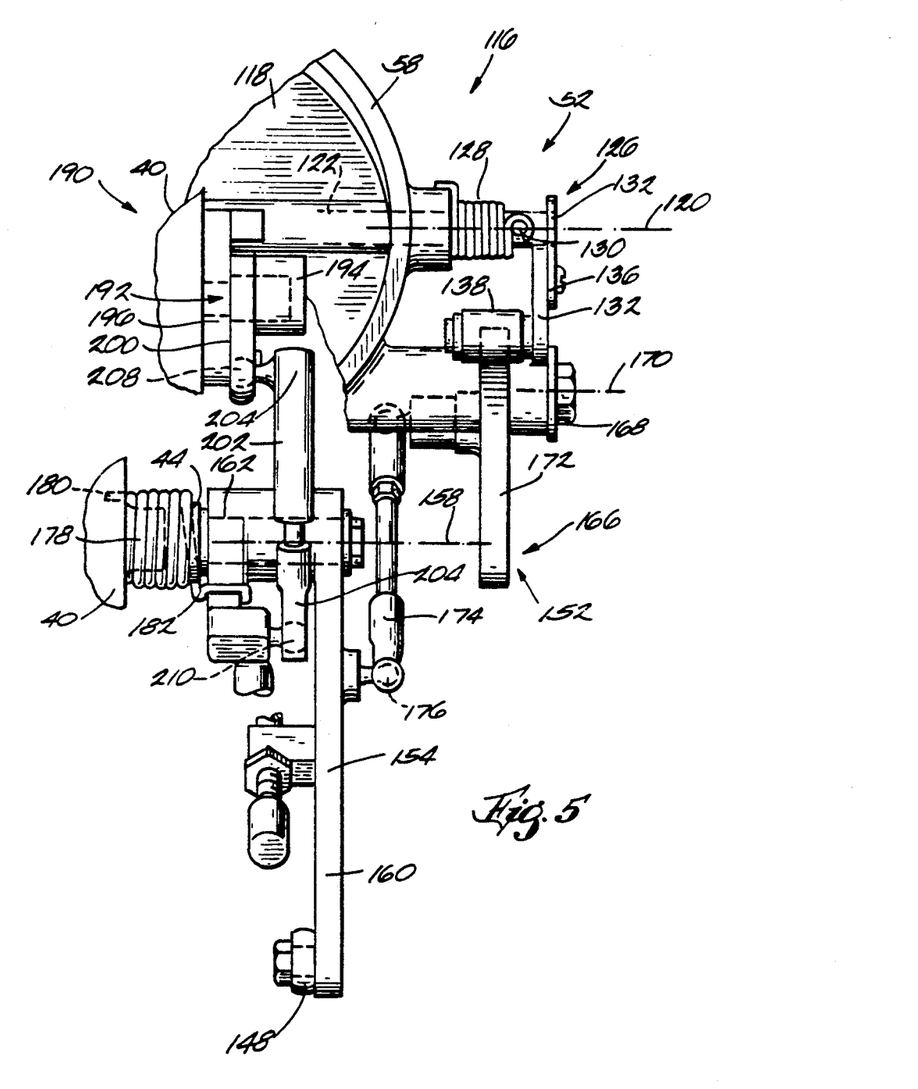
FIG. 5 is a view taken along line 5—5 in FIG. 3.

For reasons discussed below, the means 114 for supplying air to the combustion chamber 78 also includes (FIGS. 3 and 5) a cam follower 132 that extends from one of the throttle shaft stems 124 and that is fixed to the throttle shaft for common rotation therewith about the throttle valve axis 120. As shown in FIG. 5, the cam follower 132 is located outside the second portion 58 of the intake and throttle housing 52 and includes an elongated portion 136 extending generally perpendicular to the throttle valve axis 120 and supporting a roller 138 that provides a generally cylindrical follower surface 140.

Figure 3:
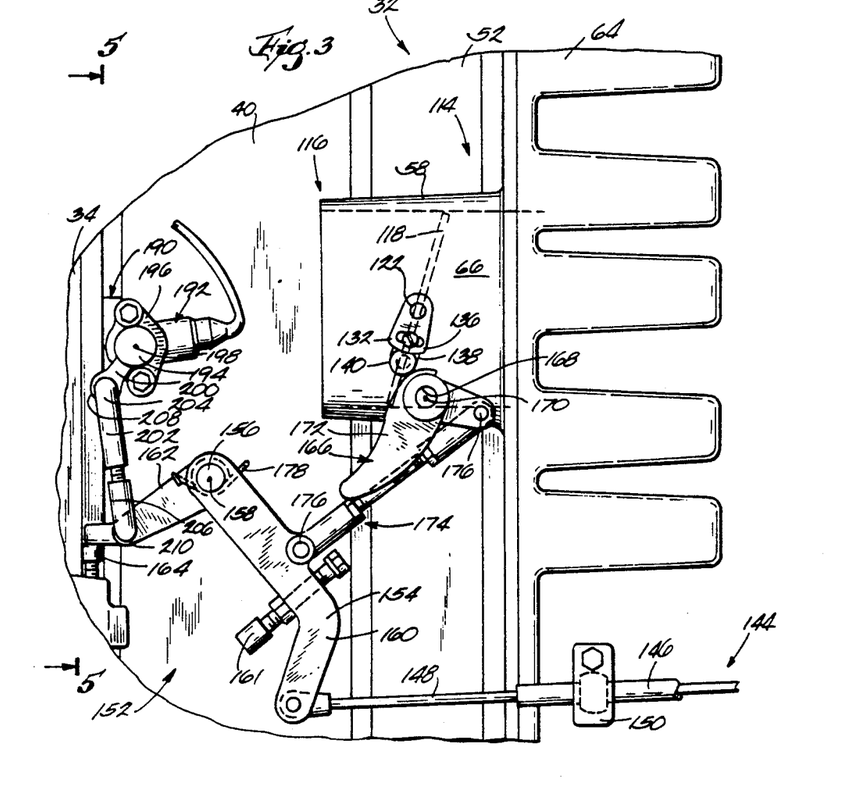
FIG. 3 is an enlarged, right side view of a portion of the engine showing the throttle lever in a first position.

The means 114 for supplying air to the combustion chamber 78 also includes (FIG. 1) an operator control member or lever 142 pivotally mounted in the boat 10 remotely from the marine propulsion device 14. A push-/pull cable 144 extends between the operator control lever 142 and the marine propulsion device 14. As shown in FIG. 3, the push/pull cable 144 has a sheath 146 housing an inner cable 148. Pivotal movement of the control lever 142 moves the inner cable 148 relative to the sheath 146. The sheath 146 has an end connected to a trunion 150 fixed to the plenum cover 64. The inner cable 148 extends outwardly of the trunion 150 and moves relative to the trunion 150 in response to movement of the operator control lever 142.

Figure 4:
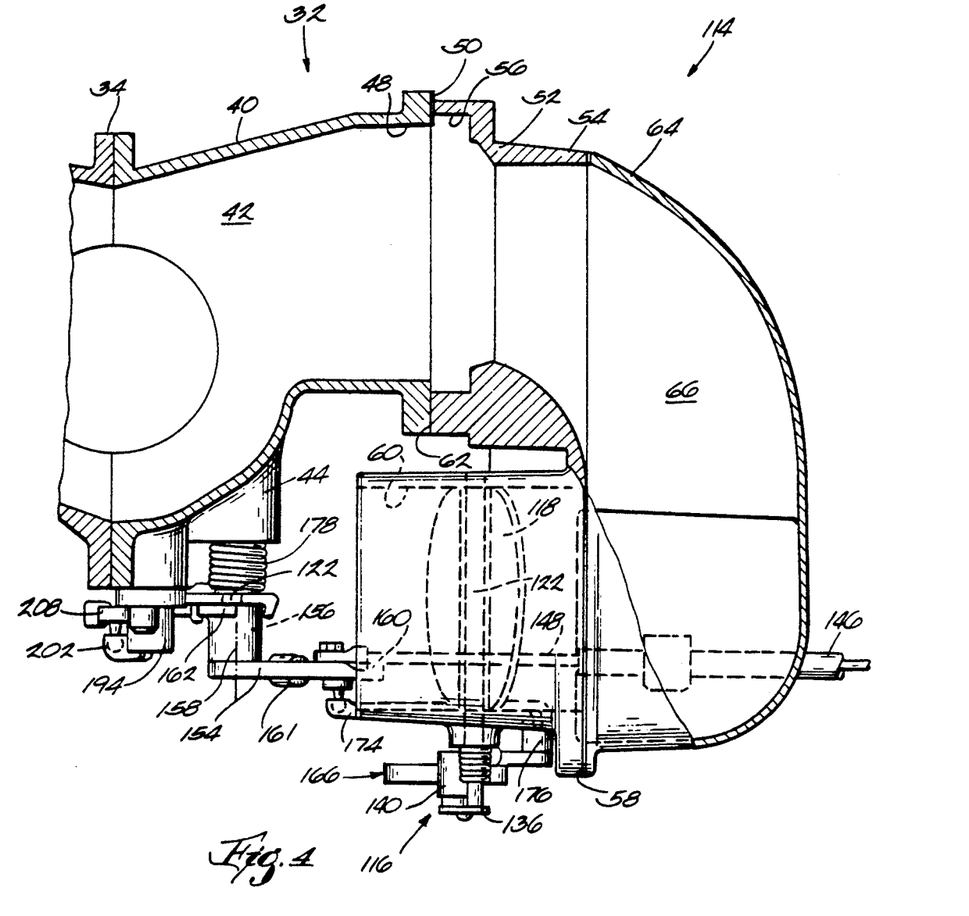
FIG. 4 is a top view of the portion of the engine shown in FIG. 3.

The means 114 for supplying air to the combustion chamber 78 also includes (FIGS. 3-5) a lost motion linkage 152 connecting the inner cable 148 and the cam follower 132 for moving the throttle plate 118 in response to movement of the operator control lever 142. While various suitable constructions for the lost motion linkage 152 can be used successfully, in the illustrated embodiment, the lost motion linkage 152 includes (FIG. 3) a throttle lever 154 in the form of a bell crank that is pivotally mounted on the engine block means 32. In particular, and as best shown in FIG. 4, the throttle lever 154 is mounted on the boss 44 on the crankcase cover 40, and is therefore indirectly supported by the engine block 34. However, it should be readily understood that the throttle lever 154 could be directly mounted on the engine block 34. The throttle lever 154 is mounted on the boss 44 by a stud or throttle lever pivot pin 156 for rotation about a throttle lever pivot axis 158 through a range of positions.

The throttle lever 154 has (FIG. 3) a first portion or arm 160 that extends from the throttle lever pivot pin 156 and that is connected to the end of the inner cable 148 extending from the located operator control lever 142, the push/pull cable 144 and the throttle lever 154, the throttle lever 154 rotates about the throttle lever pivot axis 158 in response to movement of the operator control lever 142. For reasons discussed below, the first arm 160 of the throttle lever 154 supports a first stop member 161 that is engageable with the engine block means 32 to limit the range of rotation of the throttle lever 154.

The throttle lever 154 also includes a second portion or arm 162 that extends from the throttle lever pivot pin 156. As shown in FIG. 5, the first and second arms 160, 162 of the throttle lever 154 extend in generally parallel planes that are spaced apart along the throttle lever pivot axis 158. For reasons discussed below, and as shown in FIG. 3, the end of the second arm 162 of the throttle lever 154 is engageable with a second stop member 164 that is fixed to the engine block means 32 to limit the range of rotation of the throttle lever 154.

The lost motion linkage 152 also includes a throttle cam 166 that is pivotally supported by a throttle cam pivot pin 168 fixed to the intake and throttle housing 52. The cam 166 pivots about a throttle cam pivot axis 170 through a range of positions. The throttle cam 166 includes a generally oblong portion providing a cam surface 172 that is engaged by the roller 138.

A throttle cam link 174 extends between and connects the throttle lever arm 160 and the throttle cam 166 so that rotation of the throttle lever 154 about the throttle lever pivot axis 158 rotates the throttle cam 166 about the throttle cam pivot axis 170. The link 174 is fixed to the first arm 160 of the throttle lever 154 and to the throttle cam 166 by respective swivel connections 176 that afford a direct linkage of the throttle lever 154 and the throttle cam 166 and that afford relative rotation between the link 174 and the throttle cam 166 and between the link 174 and the throttle lever 154.

The roller 138 is biased into engagement with the cam surface 172 and contact between the follower surface 140 and the cam surface 172 is maintained by the coil spring 128 (which biases the throttle plate 118 toward the closed position). The lost motion linkage 152 also includes (FIG. 5) a coil spring 178 that surrounds the boss 44. The coil spring 178 has an end 180 engaged with the boss 44 and a second end 182 engaged with the second arm 162 of the throttle lever 154. The coil spring 178 biases the throttle lever 154 in the direction (counter-clockwise in FIG. 3) toward the position in which the throttle plate 118 is closed.

Figure 6:
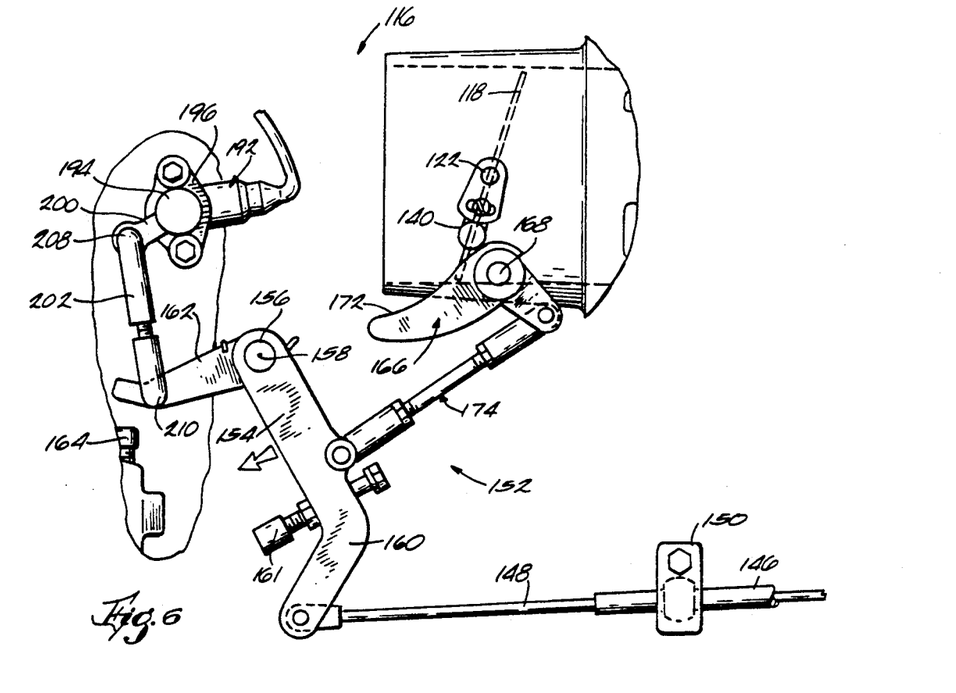
FIG. 6 is a view similar to FIG. 3 showing the throttle lever in a second position.

In operation, the lost motion linkage 152 provides rotation of the throttle lever 154 about the throttle lever pivot axis 158 in response to movement of the operator control lever 142 through the connection of the control lever 142, the push/pull cable 144 and the first arm 160 of the throttle lever 154. The lost motion linkage 152 also affords movement of the throttle lever 154 through a range of positions without moving the throttle plate 118 due to the configuration of the throttle cam 166 and the engagement between the cam surface 172 and the roller 138. In particular, and as best shown by FIGS. 3, 5 and 6, the throttle lever 154 can be rotated (clockwise in FIG. 3) by movement of the wherein the end of the second arm 162 of the throttle lever 154 engages the stop member 164 on the engine block means 32 and wherein the throttle plate 118 is in its closed position, to an intermediate position (FIG. 6). Such movement of the throttle lever 154 causes rotational movement of the throttle cam 166 about the throttle cam pivot axis 170 because of the linked connection of the throttle lever 154 and throttle cam 166. As the throttle lever 154 moves from the first position to the intermediate position, the throttle cam 166 rotates (clockwise in FIG. 3) about the throttle cam pivot axis 170 through a first range of positions between a first position shown in FIG. 3 to an intermediate position shown in FIG. 6. However, as the throttle lever 154 and throttle cam 166 move through their respective first ranges of positions, the throttle plate 118 does not move from its closed position because the portion of the cam surface 172 engaged by the roller 138 as the throttle cam 166 rotates through the first range of positions has a generally constant radius relative to the throttle cam pivot axis 170.

Figure 7:
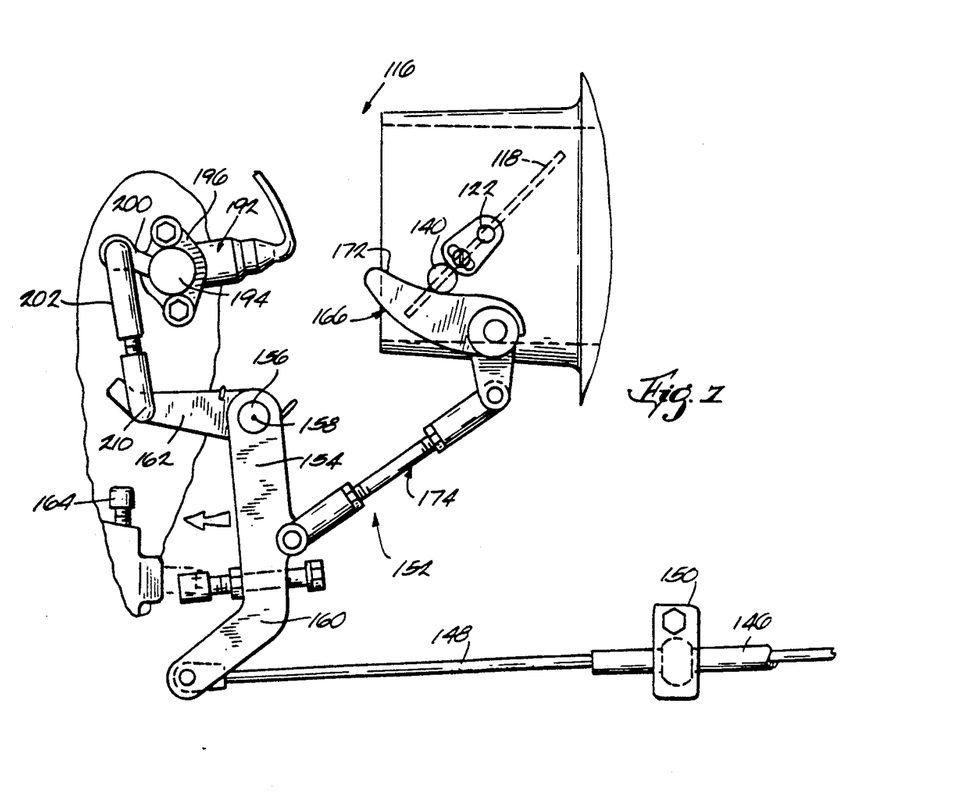
FIG. 7 is a view similar to FIG. 3 showing the throttle lever in a third position.

Further (clockwise) rotation of the throttle lever 154 through a second range of positions from the intermediate position toward a third position results in a corresponding (clockwise) rotation of the throttle cam 166 through a second range of positions from its intermediate position (FIG. 6) toward a third position (FIG. 7). As mentioned above and as shown in FIG. 7, the stop member 161 on the first arm 160 of the throttle lever 154 engages the engine block means 32 to limit further (clockwise) rotation of the throttle lever 154 about the throttle lever pivot axis 158.

Such further rotation of the throttle cam 166 from its intermediate position results in movement of the throttle plate 118 from its closed position toward an open position due to engagement of the cam surface 172 and the roller 138. Due to the configuration of the throttle cam 166, and during movement of the throttle cam 166 through the second range of positions, the cam surface 172 rotates the cam follower 132 about the throttle valve axis 120 and moves the throttle plate 118, against the bias of the coil spring 128, away from its closed position toward an open position.

The engine 22 also includes (FIG. 2) a control system 184 for controlling engine operating characteristics. In particular, the control system 184 includes means 186 for providing engine operation input signals. While various constructions of the means 186 for providing engine operation input signals can be used successfully, in the illustrated embodiment of the control system 184, such means 186 includes the crank position and engine speed sensor 82 for providing the flywheel position signal $S_{fw}$, and an engine temperature sensor 188 located in the engine block 34 for providing an engine temperature signal ($S_t$) indicating the temperature of the engine 22. Additionally, an barometric pressure sensor 187 and an air temperature sensor 189 correct for changes in air density.

The means 186 for providing engine operation input signals also includes (FIGS. 2-4) means 190 located on the engine block means 34 for providing a variable input signal $S_{cm}$ indicating the position of the operator control lever 142 independent of the position of the throttle plate 118. While various suitable constructions for the means for providing the signal $S_{cm}$ can successfully be used, in the illustrated embodiment such means includes a throttle lever position sensor 192 that is mounted on the engine block means 32 and that is connected to the second arm 162 of the throttle lever 154. The throttle lever position sensor 192 provides the input signal $S_{cm}$ and includes (FIG. 5) a position sensor housing 194 that is rotatable relative to a sensor base 196 to vary the input signal $S_{cm}$. In the illustrated embodiment, the sensor base 196 is mounted on the crankcase cover 40 adjacent the engine block 34 and therefore is indirectly supported by the engine block 34. However, it should be readily apparent that the sensor 192 can be mounted in any convenient location on the engine block means 32.

The housing 194 is rotatable through a range of positions about an axis 198. The position sensor housing 194 has a radially extending sensor arm 200 that is connected to the second arm 162 of the throttle lever 154 by a position sensor link 202. The position sensor link 202 has opposite ends 204 and 206, and a pair of swivel connections 208 and 210 respectively connect the ends 204 and 206 with the sensor arm 200 and with the second arm 162 of the throttle lever 154. Pivotal movement of the throttle lever 154 thus pivots the position sensor housing 194 relative to the throttle position sensor base 196 and thereby varies the signal $S_{cm}$.

Preferably, and as best shown in FIG. 3, the distance from the throttle lever axis 158 to the swivel connection 210 is greater than the distance from the sensor axis 198 to the swivel connection 208. Therefore, the relative lengths of the throttle lever arm 162 and the sensor arm 200 are such that an angular displacement or movement of the throttle lever 154 results in a greater angular displacement or movement of the position sensor housing 194 relative to the position sensor base 196. Such a result is desirable because an incremental movement or shift in the position of the throttle lever 154 will cause a larger incremental shift in the position sensor which, in turn, will augment the resultant variation in the signal $S_{cm}$.

The engine control system 184 also includes (FIG. 2) an electronic control unit 212 that is responsive to the various engine control input signals. The electronic control unit 212 is a conventional computer used by those of ordinary skill in the art of engine control, and includes the standard elements of a central processing unit, random access memory, read only memory, analog to digital converter, input/output circuitry and clock circuitry. The electronic control unit receives the flywheel position signal $S_{fw}$, the engine temperature signal $S_t$, and the operator control lever position signal $S_{cm}$. From those input signals, the electronic control unit 212 provides the ignition signal $S_i$ for controlling the coil 112 for firing the spark plug 110, the fuel injector signal $S_{fi}$ for controlling the air/fuel injector 98, and the oil supply signal $S_{oi}$ for controlling the oil distribution unit 84.

Because the operator control lever position sensor 192 is linked directly to the throttle lever 154 remotely from the throttle plate 118, the throttle lever position signal $S_{cm}$ provided by the operator control lever position sensor 192 directly indicates the position of the remote operator control lever 142. Movement of the operator control lever 142 through its range of positions directly moves the throttle lever position sensor housing 194 relative to the position sensor base 196, thereby varying the throttle lever position input signal $S_{cm}$ and indicating the position of the operator control lever 142. However, due to the lost motion between the throttle lever 154 and the throttle plate 118, the throttle lever position signal $S_{cm}$ varies independently of the throttle plate position. The engine 22 can be controlled by adjusting output signals to vary, for example, the ignition timing (by varying the ignition signal $S_i$) or fuel injection amount or injection timing (by varying the fuel injection signal $S_{fi}$) in response to the boat operator's speed requests (indicated by the position of the operator throttle control lever 142). In addition, greater engine control at low engine speeds is achieved by providing a direct indication of the operator's speed requests to adjust ignition timing or fuel injection independent of the throttle plate position rather than by depending upon the position of the throttle plate 118 to adjust ignition timing or fuel injection.

Various additional features of the invention are set forth in the following claims.

We claim:

1. A marine propulsion device comprising a propulsion unit which is adapted to be mounted on a boat and which includes a propeller shaft and an internal combustion engine drivingly connected to said propeller shaft, said engine including engine block means having a combustion chamber and defining an air intake passage communicable with said combustion chamber, a throttle plate movably supported by said engine block means and located in said air intake passage, means for moving said throttle plate in response to movement of an operator control member, and means supported by said engine block means for providing a signal indicating the position of the control member independent of the position of said throttle plate.

2. A marine propulsion device as set forth in claim 1 wherein said means for providing a signal includes means for varying said signal in response to movement of the control member while said throttle plate does not move.

3. A marine propulsion device as set forth in claim 1 wherein said means for moving said throttle plate in response to movement of the control member includes a lost motion linkage affording movement of the control member over a range of positions and for causing movement of said throttle plate in response to movement of the control member over only a portion of said range of positions.

4. A marine propulsion device as set forth in claim 3 wherein said lost motion linkage includes a throttle lever rotatably supported by said engine block means and adapted to be operably connected to the movable operator control member, a throttle cam rotatably supported by said engine block means, means for pivoting said throttle cam in response to pivotal movement of said throttle lever, and a follower member which is fixed to said throttle plate and which engages said throttle cam.

5. A marine propulsion device as set forth in claim 4 wherein said means for providing a signal includes a sensor operably connected to said throttle lever.

6. A marine propulsion device as set forth in claim 5 wherein said throttle cam is pivotable through a range of positions and is configured to move said follower member only over a portion of said range of throttle cam positions.

7. A marine propulsion device as set forth in claim 1 wherein said means for moving said throttle plate in response to movement of the control member includes a lost motion linkage connecting said throttle plate and the control member, and wherein said means for providing a signal includes a sensor operably connected to said lost motion linkage.

8. A marine propulsion device as set forth in claim 7 wherein said lost motion linkage includes a throttle lever rotatably supported by said engine block means, and wherein said sensor is operably connected to said throttle lever.

9. A marine propulsion device as set forth in claim 8 wherein said sensor includes a moveable element and wherein said throttle lever and said sensor are operably connected so that an incremental displacement of said throttle lever results in a greater incremental displacement of said sensor element.

10. A marine propulsion device as set forth in claim 9 wherein said sensor element pivots about a sensor axis, wherein said throttle lever pivots about a throttle axis, wherein said throttle lever and said sensor are connected by a linkage which is connected to said sensor element at a first point and which is connected to said throttle lever at a second point, and wherein the distance between said second point and said throttle lever axis is greater than the distance between said sensor axis and said first point.

11. A marine propulsion device as set forth in claim 1 wherein said engine block means includes an engine block, a crankcase cover, and a manifold, wherein said throttle plate is supported by said manifold, and wherein said signal providing means is supported by said crankcase cover.

12. A marine propulsion device as set forth in claim 1 wherein said marine propulsion device is an outboard motor.

13. An internal combustion engine comprising an engine block means having therein a combustion chamber, means for supplying air to said combustion chamber, said means including a throttle lever which is rotatably supported by said engine block means for movement through a range of positions and which is adapted to be operably connected to an operator control member, a moveable throttle plate, and means for moving said throttle plate in response to movement of said throttle lever, and means responsive to movement of said throttle lever for providing a signal independent of movement of said throttle plate.

14. An engine as set forth in claim 13 wherein said throttle lever includes a first arm adapted to be operably connected to the operator control member and a second arm connected to said means for providing a signal.

15. An engine as set forth in claim 13 wherein said means for moving said throttle plate is a lost motion linkage affording movement of said throttle lever over a range of positions and causing movement of said throttle plate in response to movement of said throttle lever only over a portion of said range of positions.

16. An engine as set forth in claim 15 wherein said lost motion linkage includes a throttle cam movably supported by said engine block means and connected to said throttle lever, a follower member connected to said throttle plate, and means for biasing said follower member into engagement with said throttle cam and for maintaining contact between said follower member and said throttle cam.

17. An engine as set forth in claim 15 wherein said means for providing a signal includes a sensor supported by said engine block means.

18. An engine as set forth in claim 17 wherein said sensor includes a moveable element and wherein said throttle lever and said sensor are operably connected so that an incremental displacement of said throttle lever results in a greater incremental displacement of said sensor element.

19. An engine as set forth in claim 18 wherein said sensor element pivots about a sensor axis, wherein said throttle lever pivots about a throttle axis, wherein said throttle lever and said sensor are connected by a linkage which is connected to said sensor element at a first point and which is connected to said throttle lever at a second point, and wherein the distance between said throttle lever axis and said second point is greater than the distance between said sensor axis and said first point.

20. An outboard motor comprising a lower unit which is adapted to be mounted on a boat and which includes a propeller shaft, and an internal combustion engine supported by said lower unit and drivingly connected to said propeller shaft, said engine including engine block means having a combustion chamber and defining an air intake passage communicable with said combustion chamber, a throttle plate movably supported by said engine block means and located in said air intake passage, means for moving said throttle plate in response to movement of an operator control member, said means for moving said throttle plate including a throttle lever movably supported by said engine block means, and a lost motion linkage for moving said throttle plate in response to movement of said throttle lever only over a portion of the range of movement of said throttle lever, and means including a sensor connected to said throttle lever for providing to an electronic control unit a signal indicating the position of the control member independent of the position of said throttle plate.

* * * * *